United States Patent [19]

Harris

[11] Patent Number: 4,830,058
[45] Date of Patent: May 16, 1989

[54] CLOSURE CAP WITH CLUTCH-ACTUATED RELEASE

[75] Inventor: Robert S. Harris, Connersville, Ind.
[73] Assignee: Stant Inc., Connersville, Ind.
[21] Appl. No.: 152,947
[22] Filed: Feb. 8, 1988
[51] Int. Cl.[4] ........................ F16L 55/10; B65D 41/04
[52] U.S. Cl. ...................... 138/89; 220/200; 220/260; 220/281; 220/DIG. 20; 220/DIG. 33; 220/288
[58] Field of Search .................... 138/89, 90; 220/210, 220/DIG. 20, DIG. 33, 200, 281, 260, 288; 70/165, 163

[56] References Cited

U.S. PATENT DOCUMENTS

| | | |
|---|---|---|
| 1,453,299 | 5/1923 | Wetzel . |
| 1,847,117 | 3/1932 | Lantero ............................ 220/210 |
| 1,985,787 | 12/1934 | Bourveau ........................ 138/89 X |
| 2,010,200 | 8/1935 | Rufener et al. ...................... 138/89 |
| 2,437,674 | 3/1948 | Armbruster ........................ 220/210 |
| 4,280,347 | 7/1981 | Evans ................................ 70/165 |
| 4,453,388 | 6/1984 | Baker et al. ........................ 70/165 |
| 4,458,824 | 7/1984 | Baker et al. ................. 220/DIG. 33 |
| 4,527,406 | 7/1985 | Baker ................................ 70/165 |
| 4,678,097 | 7/1987 | Crute ............................ 138/89 X |
| 4,712,586 | 12/1987 | McCauley et al. .................. 138/89 |
| 4,712,703 | 12/1987 | Oddenino .......................... 220/210 |

FOREIGN PATENT DOCUMENTS

| | | | |
|---|---|---|---|
| 2014130 | 12/1971 | Fed. Rep. of Germany ........ 70/165 |
| 947882 | 7/1949 | France ................................ 220/281 |
| 1190429 | 10/1959 | France ................................ 70/165 |
| 1262388 | 4/1961 | France ................................ 70/165 |

Primary Examiner—James E. Bryant, III
Attorney, Agent, or Firm—Barnes & Thornburg

[57] ABSTRACT

A cap includes a closure portion rotatably engaging the filler neck for closing the filler neck and an outer shell for providing a hand grip to permit rotation of the cap about an axis. A clutch is included in the cap for selectively providing an operative connection between the outer shell and the closure portion so that rotation of the outer shell relative to the filler neck in a cap-removal direction will rotate the closure portion in the cap-removal direction. An actuator is provided for activating the clutch means. The actuator is reciprocable relative to the outer shell in operative directions substantially parallel to the axis of rotation of the outer shell to control activation of the clutch.

12 Claims, 2 Drawing Sheets

CLOSURE CAP WITH CLUTCH-ACTUATED RELEASE

BACKGROUND AND SUMMARY OF THE INVENTION

This invention relates to closure caps for filler necks, and particularly to a cap having a manually actuable clutch for selectively interconnecting a filler neck-engaging closure portion of the cap and a separate rotatable cap lid to establish a driving connection therebetween for enabling removal of the cap from the filler neck. More particularly, the present invention relates to a cap of improved crashworthiness having a filler neck closure and a separate lid that are normally rotatable relative to one another when mounted on a filler neck yet are selectively connectable using a clutch to permit removable of the closure from the filler neck upon actuation of the clutch and roatation of the lid relative to the filler neck in a cap-removal direction.

The outer shell or lid of a fuel cap is generally exposed to a wide variety of impact forces during a vehicle accident or the like. Frequently, these impact forces act to rotate the lid relative to the filler neck. This lid rotation can lead to breakage of the filler neck seal established between the filler neck and the closure portion of the cap which engages the filler neck because of a common connection rigidly joining the lid to the filler neck-engaging closure portion. Liquid fuel might leak without a fluid-blocking seal in place at the mouth of the filler neck. Leakage of combustible liquid fuel from the filler neck resulting from failure of the seal would be particularly undesirable in the moments following a vehicle accident.

One object of the present invention is to provide a cap having an outer shell or lid that is independently rotatable relative to a filler neck-engaging closure portion while the cap is mounted on the filler neck and that can be coupled to rotate with the closure portion during removal of the cap from the filler neck.

Another object of the present invention is to provide a cap which is configured to withstand impact forces generally experienced in a vehicle accident or the like without easily breaking the seal formed between the cap and the filler neck on which the cap is mounted.

Yet another object of the present invention is to provide a cap having an outer shell or lid that is normally rotatable relative to the sealed closure portion mounted on the filler neck to minimize disturbance to the sealed closure portion upon exposure of the lid to substantial impact force during a vehicle accident or the like, and yet is selectively connectable to the sealed closure portion to rotate the closure portion relative to the filler neck and break the seal therebetween upon manual rotation of the lid in a cap-removal direction during normal removal of the cap from the filler neck prior to refueling.

In accordance with the present invention, a cap is provided for a threaded filler neck. The cap includes closure means rotatably engaging the filler neck for closing the filler neck and shell means for providing a hand grip to permit rotation about an axis. Clutch means is included in the cap for selectively providing an operative connection between the shell means and the closure means so that rotation of the shell means relative to the filler neck in a cap-removal direction will rotate the closure means in the cap-removal direction. Actuation means is provided for activating the clutch means, the actuation means being reciprocable relative to the shell means in operative directions substantially parallel to the axis of rotation of the shell means to control activation of the clutch means.

In preferred embodiments, the closure means is formed to include a central aperture and includes seal means for establishing a seal with the filler neck to block the escape of fluid in the filler neck to the atmosphere. The clutch means includes spring means for yieldably biasing the actuation means toward its extended position so that the shell means is normally rotatable relative to the closure means while the cap is mounted on the filler neck without breaking the seal established by the seal means, thereby enhancing crashworthiness of the cap.

The shell means includes sleeve means for yieldably receiving the actuation means. The sleeve means is configured to include an exterior opening to expose the actuation means so that a user may manually slide the actuation means relative to the shell means.

The actuation means includes a plunger and the clutch means includes bolt means for engaging the closure means and fixture means coupled to the shell means for slidably receiving the bolt means. The bolt means is thus movable relative to the shell means from an inactive retracted position away from the closure means toward an active projected position engaging the closure means in response to axial movement of the plunger relative to the shell means.

The actuation means further includes spring means acting between the plunger and the fixture means for yieldably biasing the plunger away from the closure means. The plunger includes a cam driver and the bolt means includes cam follower means for converting axial movement of the cam driver into radially outward movement of the bolt means toward its protective projected position during operation of the plunger.

One feature of the present invention is the provision of actuation means for activating the clutch means. This feature enables one to establish an operative connection between the shell means and the closure means just before the cap intentionally is to be removed from the filler neck. Desirably, the actuation means is reciprocable relative to the shell means in operative directions parallel to the axis of rotation of the shell means so that the actuation means is unlikely to move in operative directions in response to radially directed impact forces of the type which might cause the shell means to rotate.

Another feature of the present invention is the inclusion in the clutch means of spring means for yieldably biasing the actuation means toward its extended position so that the shell means is normally rotatable relative to the closure means while the cap is mounted on the filler neck. The operative connection is not extant while the cap is in its normal mounted position on the filler neck, which is when most vehicle accidents happen. The closure means is not normally coupled to rotate with the shell means because of the configuration of the clutch means. Advantageously, the closure means can then remain in a fully tightened position on the filler neck even if the shell means is exposed to an impact force or blow during a vehicle accident or the like causing the shell means to rotate relative to the filler neck.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
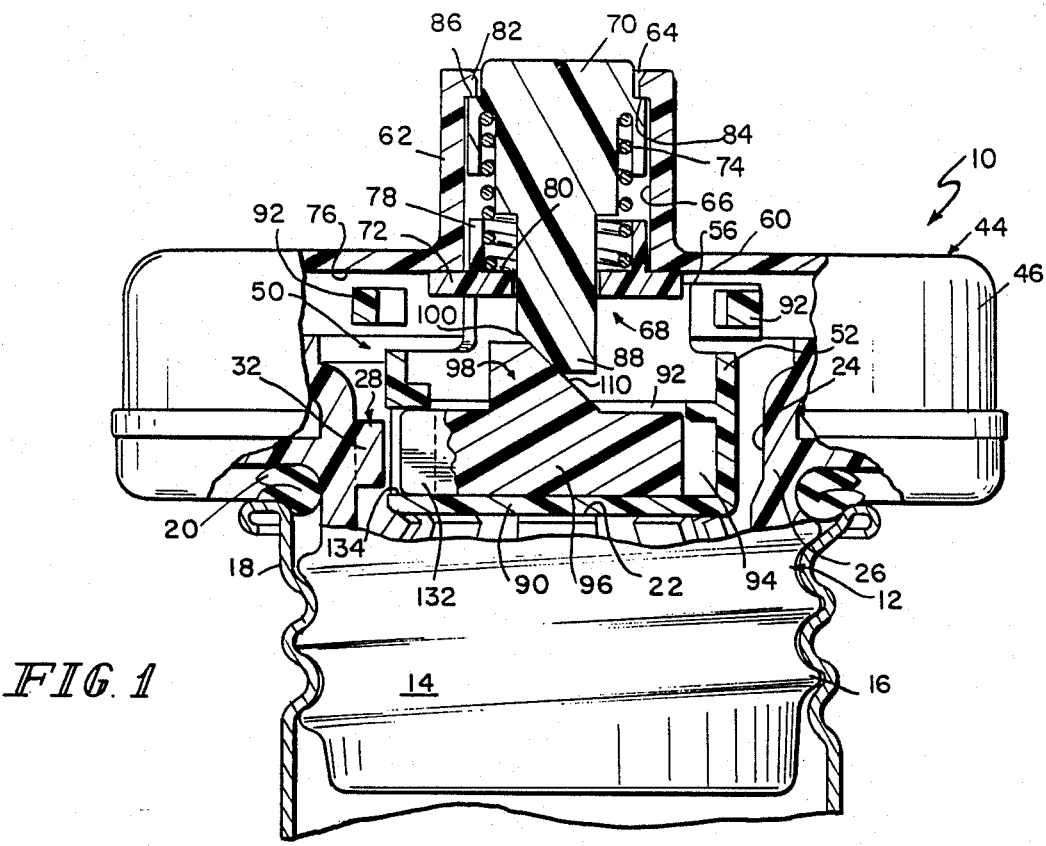
FIG. 1 is a side elevation view of a preferred embodiment of the present invention with portions broken away showing decoupling of the shell member and the closure member.

Referring now particularly to FIG. 1, the closure cap 10 includes a molded plastic closure member 12 having an axially inwardly extending shank portion 14. Shank portion 14 is preferably threaded as indicated at 16 to engage a threaded filler neck 18. However, it is within the scope of the present invention to configure shank portion 14 to include a cam-on connection (not shown) for engaging a filler neck.

A gasket 20 sealably engages the conventional peripherally and radially outwardly extending lip provided by filler neck 18. Cap 10 further can include a pressure-vacuum vent valve assembly (not shown) for controlling, in a manner which is well known, venting of pressure and vacuum which develop with a fuel tank (not shown) coupled to the filler neck 18.

Figure 2:
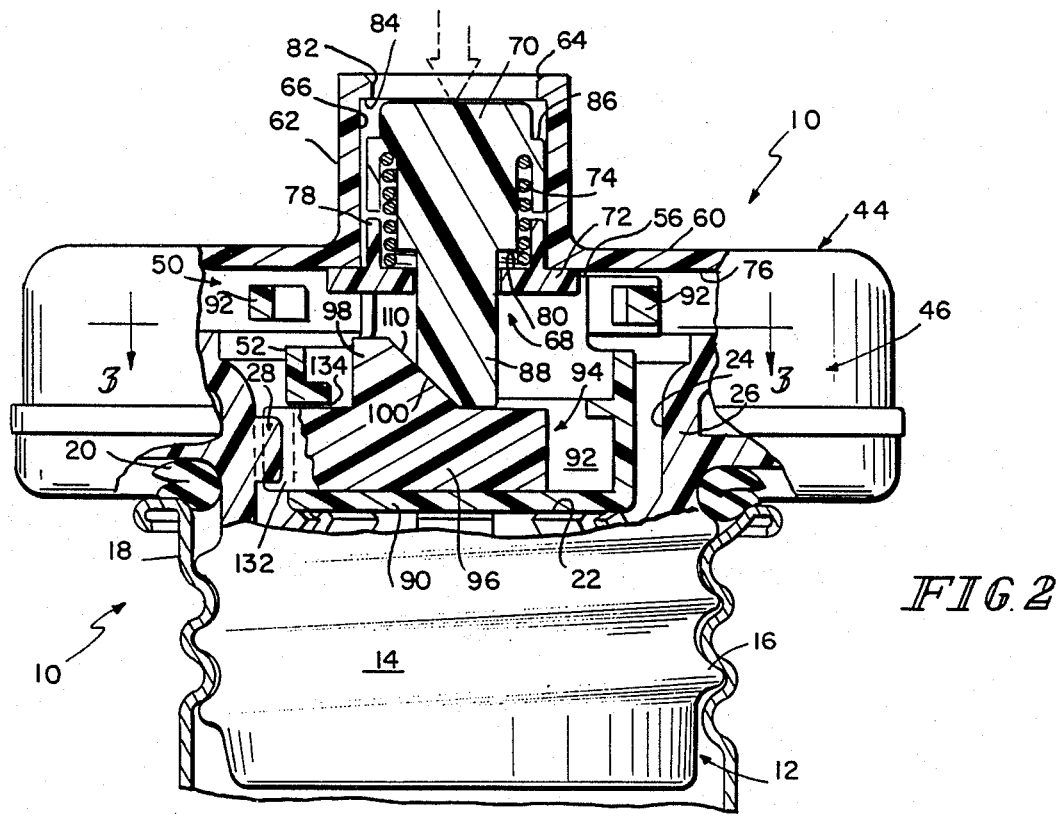
FIG. 2 is a view similar to FIG. 1 showing coupling of the shell member and the closure member after depression of the plunger to actuate the clutch means.
Figure 3:
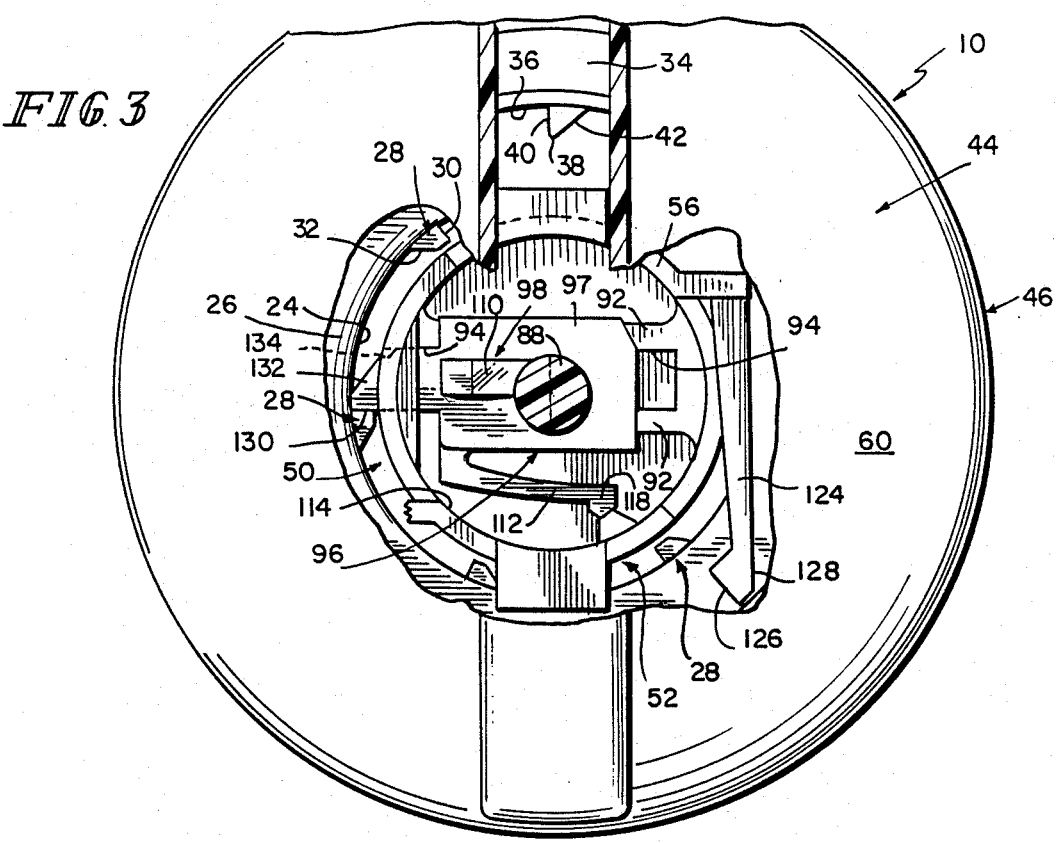
FIG. 3 is a fragmentary sectional view of the cap of FIG. 2, taken generally along lines 3—3 thereof, with the bolt in a cap-removal position.

Closure member 12 further includes an annular supporting wall 22 as shown in FIG. 1. A generally cylindrical wall region 24 is defined within an axially outer end 26 of closure member 12. Wall region 24 is provided with a plurality of radially inwardly extending engaging teeth 28 as shown in FIGS. 1-3. Each tooth 28 includes a generally radially and axially extending locking surface 30 and a generally chordally and axially extending camming surface 32.

Cap 10 further includes an annular race 34 which is disposed for rotation within the cap as shown in FIG. 3. Race 34 includes a radially inwardly facing, peripherally extending inner wall 36 which provided with four radially inwardly extending projections 38. Each projection 38 includes an abrupt radially and axially extending drive face 40 and an inclined camming surface 42. Race 34 can also be configured to provide a torque-override connection with closure member 12 in the manner disclosed in U.S. Pat. No. 4,280,347 to Evans.

Cap 10 further includes a molded plastic shell member or lid 44 provided with a hand grip 46 and secured to the closure member 12 for selective rotation with respect to the closure member 12 about the axis of the cap 10. Shell member 44 is permitted to rotate relative to closure member 12 while cap 10 is mounted on the filler neck 18 and is coupled to rotate with the closure member 12 during removal of cap 10 from the filler neck 18. In the latter circumstance, shell member 44 operates as the driving part and closure member 12 operates as the driven part in the novel manually actuable clutch mechanism to be described below.

Crashworthiness of the cap 10 is enhanced by allowing shell member 44 to rotate relative to closure member 12 while the cap 10 is in its normal, mounted position on the filler neck 18 because closure member 12 will not be rotated relative to the filler neck to a seal-breaking position upon rotation of shell member 44 caused by an impact to the shell member 44 during a vehicle crash. The risk of fuel leakage is lessened by maintaining closure member 12 in its tightened position against gasket 20 on the distal end of filler neck 18.

A clutch mechanism 50 is assembled in cap 10 to permit the shell member 44 to be coupled to the closure member 12 selectively. Clutch mechanism 50 includes a generally cup-shaped portion, or hub, 52, and includes axially outwardly extending projections 54 diametrically opposed about the upper annular edge 56 of hub 52.

Shell member 44 includes a top surface 60 and an upstanding hollow sleeve 62 on the top surface 60. Sleeve 62 is formed to include a central circular aperture 64 at the distal end of the sleeve 62 and a central axial passageway 66 to accommodate an actuation assembly 68. Actuation assembly 68 includes a plunger 70 slidably mounted in passageway 66, a fixture 72, and a coiled spring 74 acting between plunger 70 and fixture 72.

Fixture 72 is trapped between upper annular edge 56 of hub 52 and the underside 76 of top surface 60 as shown in FIGS. 1 and 2. Fixture 72 is configured to provide a spring guide skirt 78 and an axially lower boundary wall 80 supporting spring 74 and limiting downward movement of plunger 70 in passageway 66.

Sleeve 62 includes an annular lip 82 configured to define central circular aperture 64 and providing an axially downwardly facing boundary wall 84. Boundary wall 84 limits upward movement of plunger 70 in passageway 66 by being situated to engage the annular rim 86 provided near the axially outer end of plunger 70 as shown best in FIG. 1. Plunger 70 further includes a cam driver 88 at its axially inner end.

The bottom 90 of hub 52 is provided with a pair of chordally extending guides 92 defining a bolt slideway 94. A bolt 96 including a head 97 and an upstanding cam follower 98 is slidably guided in the slideway 94. As shown best in FIGS. 3 and 4, bolt 96 is held in the slideway 94 between the bottom of hub 52 and the closely spaced axially inner end of cam driver 88 so that cam follower 98 is aligned underneath cam driver 88. The cam driver 88 includes a downwardly presented inclined camming surface 100 and the cam follower 98 includes an upwardly presented inclined camming surface 110.

The bolt head 97 includes a resilient spring-like projection 112 which extends generally longitudinally of the slideway 94 across hub 52. A generally cylindrical interior wall 114 of hub 52 is provided with an axially extending blocking ridge 116 which cooperates with the head 118 of spring-like projection 112 on bolt head 97 to hold the bolt 96 yieldably in either of two positions which will be described.

Figure 4:
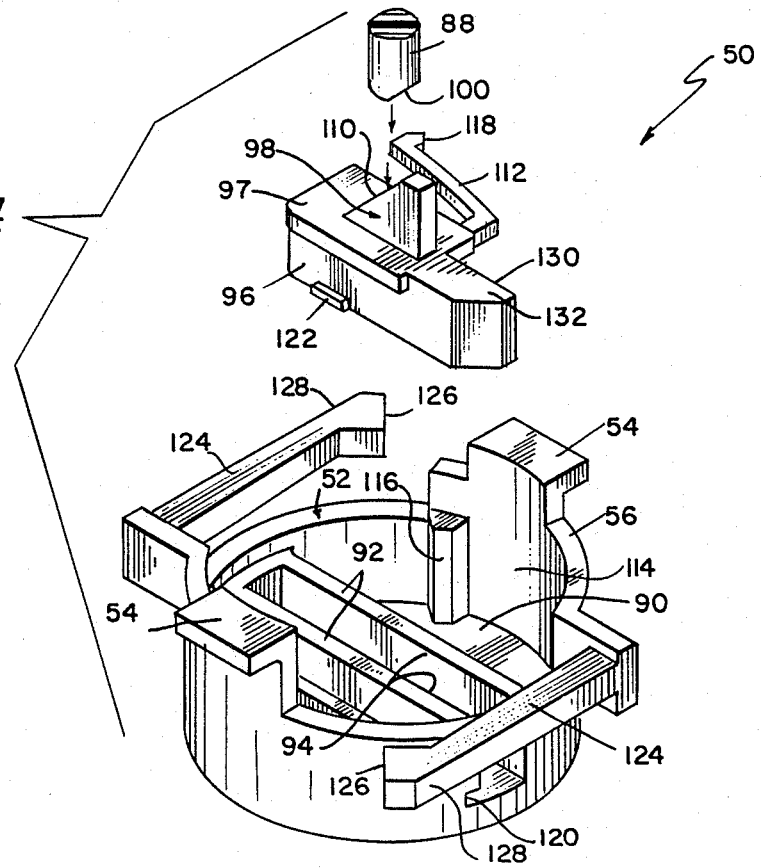
FIG. 4 is an exploded perspective view of a portion of the cap mechanism of FIGS. 1-3.

As best seen in FIG. 4, slideway 94 includes an axially inward, chordally extending slot 120 formed in one of the chordally extending guides 92. Bolt 96 includes an axially inward projection 122 which slidably engages in groove 120 to keep bolt 96 from being projected axially outwardly in slideway 94 and to improve the assembly of the various components in, for example, an upside-down orientation.

Projections 54 extend into diametrically opposed pockets (not shown) molded into the underside 76 of the shell member 44. The axially extending projections 54 also provide resilient molded drive fingers 124. Fingers 124 extend generally along chords of a circle defined by shell member 44. Fingers 124 include radially and axially extending engaging surfaces 126 and camming surfaces 128 at their distal ends. The engagement of projections 54 in the pockets (not shown) provided in shell member 44 locks clutch mechanism 50 for rotation with shell member 44. Reference is hereby made to U.S. Pat. No. 4,280,347 to Evans for a description of the assembly and interaction of closure member 12, race 34, and shell member 44 and also for a description of the replacement of the cap on the filler neck 18.

Removal of the cap 10 from filler neck 18 is accomplished in the following manner. Until actuation of clutch mechanism 50 by plunger 70, shell member 44 is freely rotatable with respect to closure member 12 to enhance crashworthiness of cap 10. Assuming cap 10 is to be removed from filler neck 18 prior to refueling, the plunger 70 is manually depressed and moved downwardly toward hub 52 from its axially upper position shown in FIG. 1 to its axially lower position shown in FIG. 2. Such action causes the surfaces 100, 110 of cam driver 88 and cam follower 98 to engage in camming relation and slide relative to one another to urge bolt 96 in the slideway 94 from its retracted position illustrated in FIG. 1 to its projected position illustrated in FIGS. 2 and 3. The head 118 of spring-like projection 112 is thereby cammed over the blocking ridge 116 to the position illustrated in FIG. 3. Bolt 96 is thereby held yieldingly in its projected position with a locking surface 130 of its end 132 projecting through an opening 134 in side wall 114 of hub 52 to engage the locking surface 30 of one of the engaging teeth 28 provided on the generally cylindrical wall region 24 of closure member 12. With the bolt 96 in this position, shell member 44 can be rotated in the cap-removal direction (counter-closewise in FIG. 3) since the clutch mechanism 50 is locked for rotation with the shell member 44 by projections 64, such rotation of shell member 44 backs the threads 16 out of engagement with the filler neck and permits the cap 10 to be removed.

Although the invention has been described in detail with reference to certain preferred embodiments, variations and modifications exist within the scope and spirit of the invention as described and defined in the following claims.

What is claimed is:

1. A cap for a threaded filler neck, the cap comprising
closing means rotatably engaging the filler neck for closing the filler neck,
a rotatable lid covering the closing means, the lid being formed to include a central aperture, and
interconnecting means for selectively interconnecting the lid and the closing means normally to permit rotation of the lid relative to the closing means, the interconnecting means including activating means received in the central aperture of the lid for selectively activating the interconnecting means to establish a driving connection between the rotatable lid and the closing means in response to movement of the activating means in an axial direction substantially parallel to the axis of rotation of the rotatable lid, the closing means including sealing means for establishing a seal with the filler neck to block the escape of fluid in the filler neck to the atmosphere, the activating means reciprocating in the central aperture of the rotatable lid between an extended position permitting deactivation of the interconnecting means and a depressed position activating the coupling interconnecting means, and the interconnecting means further including biasing means for yieldably biasing the activating means towards its extended position so that the lid is normally rotatable relative to the closing means while the cap is mounted on the filler neck without breaking the seal established by the sealing means, thereby enhancing crashworthiness of the cap.

2. A cap for a threaded filler neck, the cap comprising
closing means rotatably engaging the filler neck for closing the filler neck,
a rotatable lid covering the closing means, the lid being formed to include a central aperture, and
interconnecting means for selectively interconnecting the lid and the closing means normally to permit rotation of the lid relative to the closing means, the interconnecting means including activating means received in the central aperture of the lid for selectively activating the interconnecting means to establish a driving connection between the rotatable lid and the closing means in response to movement of the activating means in an axial direction substantially parallel to the axis of rotation of the rotatable lid, the interconnecting means further including engaging means for engaging the closing means including a bolt and a cam follower, and supporting means rigidly coupled to the rotatable lid for supporting the engaging means in proximity to the closing means so that the bolt is movable between a projected position engaging the closing means and a retracted position disengaged from the closing means, the activating means including a cam driver presented toward the cam follower of the engaging means, the cam driver and cam follower cooperating to convert movement of the activating means in said axial direction into movement of the bolt toward its projected position during operation of the activating means.

3. The cap of claim 2, wherein the activating means is reciprocable in the central aperture between an inactive position permitting movement of the bolt toward its retracted position and a depressed position acting to move the bolt toward its projected position due to camming engagement of the cam driver and cam follower and the interconnecting means further includes spring means for yieldably biasing the activating means toward its inactive position.

4. A cap for a threaded filler neck, the cap comprising
closing means rotatably engaging the filler neck for closing the filler neck,
rotation providing means for providing a hand grip to permit rotation about an axis,
connection selectively providing means for selectively providing an operative connection between the rotation providing means and the closing means so that rotation of the rotation providing means relative to the filler neck in a cap-removal direction will rotate the closing means in the cap-removal direction, and
activating means internal of the rotation providing means for activating the connection selectively providing means, the activating means reciprocating relative to the rotation providing means in axial directions substantially parallel to the straight longitudinally extending axis about which the rotation providing means rotates and fixed rotatingly with respect to the closing means to activate the connection selectively providing means.

5. The cap of claim 4, wherein the closing means is formed to include a central aperture, the closing means includes seal establishing means for establishing a seal with the filler neck to block the escape of fluid in the filler neck to the atmosphere, and the connection selectively providing means includes biasing means for yieldably biasing the activating means toward its extended position so that the rotation providing means is normally rotatable relative to the closing means while the cap is mounted on the filler neck without breaking the seal established by the seal establishing means, thereby enhancing crashworthiness of the cap.

6. The cap of claim 4, wherein the rotation providing means includes receiving means for yieldably receiving the activating means and the receiving means is configured to include an exterior opening to expose the activating means so that a user may manually slide the activating means relative to the rotation providing means.

7. The cap of claim 6, wherein the rotation providing means is configured to provide an interior region, the connection selectively providing means includes a fixture coupled to the rotation providing means to lie in the interior region of the rotation providing means, and the activating means includes a plunger slidably received in the receiving means and biasing means acting between the plunger and the fixture for yieldably biasing the plunger toward the exterior opening of the receiving means.

8. The cap of claim 4, wherein the activating means includes a plunger and the connection selectively providing means includes engaging means for engaging the closing means and receiving means coupled to the rotation providing means for slidably receiving the engaging means to permit movement of the engaging means relative to the rotation providing means from an inactive retracted position away from the closing means toward an active projected position engaging the closing means in response to axial movement of the plunger relative to the rotation providing means.

9. The cap of claim 8, wherein the activating means further includes biasing means acting between the plunger and the receiving means for yieldably biasing the plunger away from the closing means.

10. The cap of claim 8, wherein the plunger includes a cam driver and the engaging means includes a bolt and a cam follower for converting axial movement of the cam driver into radially outward movement of the bolt toward its protective projected position during operation of the plunger.

11. A cap for a threaded filler neck, the cap comprising
a closure member for rotatably engaging the filler neck to close the filler neck,
a lid rotatably supported on the closure member, the lid having an interior wall presented toward the closure member and being configured to include a central aperture providing an opening in the interior wall,
a hub depending from the interior wall of the lid, the hub being rigidly coupled to the interior wall to surround the central aperture opening and to rotate with the lid, the hub being formed to include a side aperture facing the closure member and an internal chordally extending slideway communicating with the side aperture,
a bolt including a cam follower and latch member for engaging the closure member, the bolt being received in the internal slideway of the hub to position the latch member in proximity to the side aperture and to present the cam follower toward the central aperture opening, the bolt being movable between a projected position wherein the latch member extends through the side aperture to engage the closure member and a retracted position wherein the latch member is disengaged from the closure member to permit rotation of the lid relative to the closure member, and
a plunger slidably mounted in the central aperture, the plunger including a cam driver for engaging the cam follower during movement of the plunger in a central aperture to slide the bolt toward its projected position to establish a driving connection between the lid and the closure member.

12. The cap of claim 11, wherein the cap further includes seal establishing means for establishing a seal with the filler neck to block the escape of fluid in the filler neck to the atmosphere and spring member acting between the hub and the plunger to yieldably bias the cam driver toward a raised position permitting movement of the bolt toward its retracted position so that the lid is normally rotatable relative to the closure member while the cap is mounted on the filler neck without breaking the seal established by the seal establishing means, thereby enhancing crashworthiness of the cap.

* * * * *